(12) United States Patent
Spahr et al.

(10) Patent No.: US 10,870,761 B2
(45) Date of Patent: Dec. 22, 2020

(54) HIGH-CONDUCTIVE CARBON BLACK WITH LOW VISCOSITY

(71) Applicant: Imerys Graphite & Carbon Switzerland Ltd., Bodio (CH)

(72) Inventors: Michael E. Spahr, Bellinozona (CH); Simone Zürcher, Origlio (CH); Marlene Rodlert-Bacilieri, Breganzona (CH); Flavio Mornaghini, Breganzona (CH); Thomas M. Gruenberger, Brussels (BE)

(73) Assignee: ImerTech SAS, Paris (FR)

( * ) Notice: Subject to any disclaimer, the term of this patent is extended or adjusted under 35 U.S.C. 154(b) by 172 days.

(21) Appl. No.: 15/736,360

(22) PCT Filed: Jul. 8, 2016

(86) PCT No.: PCT/EP2016/066343
§ 371 (c)(1),
(2) Date: Dec. 14, 2017

(87) PCT Pub. No.: WO2017/005921
PCT Pub. Date: Jan. 12, 2017

(65) Prior Publication Data
US 2018/0155552 A1    Jun. 7, 2018

(30) Foreign Application Priority Data
Jul. 9, 2015 (EP) .................. EP15176181

(51) Int. Cl.
| | | |
|---|---|---|
| *C09C 1/48* | (2006.01) | |
| *C08K 3/04* | (2006.01) | |
| *H01M 4/62* | (2006.01) | |
| *H01B 1/04* | (2006.01) | |
| *H01M 4/131* | (2010.01) | |

(52) U.S. Cl.
CPC .................. *C09C 1/48* (2013.01); *C08K 3/04* (2013.01); *H01B 1/04* (2013.01); *H01M 4/625* (2013.01); *C01P 2002/72* (2013.01); *C01P 2004/04* (2013.01); *C01P 2006/12* (2013.01); *C01P 2006/16* (2013.01); *C01P 2006/17* (2013.01); *C01P 2006/19* (2013.01); *C01P 2006/40* (2013.01); *C08K 2201/001* (2013.01); *C08K 2201/006* (2013.01); *C08L 2207/062* (2013.01); *H01M 4/131* (2013.01)

(58) Field of Classification Search
CPC ....................................................... C09C 1/48
See application file for complete search history.

(56) References Cited

U.S. PATENT DOCUMENTS

| 4,216,194 | A | * | 8/1980 | Regier | C07C 1/0455 |
| | | | | | 423/459 |
| 4,590,052 | A | * | 5/1986 | Chevallier | C08K 3/36 |
| | | | | | 423/335 |
| 7,452,514 | B2 | * | 11/2008 | Fabry | B01J 19/02 |
| | | | | | 204/173 |
| 8,852,739 | B2 | | 10/2014 | Schinkel et al. | |
| 10,072,154 | B2 | * | 9/2018 | Wampler | C09C 1/50 |
| 10,087,330 | B2 | * | 10/2018 | Green | B82Y 30/00 |
| 2014/0013996 | A1 | | 1/2014 | Dikan et al. | |
| 2014/0162064 | A1 | | 6/2014 | Dikan et al. | |
| 2014/0251179 | A1 | | 9/2014 | Liu et al. | |

FOREIGN PATENT DOCUMENTS

| CN | 101426862 A | 5/2009 |
| CN | 102161843 A | 8/2011 |
| CN | 104619788 A | 5/2015 |
| CN | 105026501 A | 11/2015 |
| EP | 2 361 954 A1 | 8/2011 |
| WO | WO 2005/113688 A2 | 12/2005 |
| WO | WO 2014/012002 | 1/2014 |
| WO | WO 2014/137964 | 9/2014 |

OTHER PUBLICATIONS

International Search Report and Written Opinion dated Sep. 13, 2016, in International Application No. PCT/EP2016/066343 (12 pgs.).
Search Report for Chinese Application No. 2016800388457 dated Jan. 8, 2020. (2 pages).
Second Office Action in Chinese Application No. 2016800388457 dated Sep. 9, 2020. (11 pages).

* cited by examiner

*Primary Examiner* — Stuart L Hendrickson
(74) *Attorney, Agent, or Firm* — Finnegan, Henderson, Farabow, Garrett & Dunner, LLP

(57) ABSTRACT

The present disclosure relates to novel carbon black materials characterized by a good retention of their structure in the compressed state, as shown, e.g., by a relatively high ratio of compressed OAN/OAN. The materials may inter alia be characterized by a low viscosity in dispersions and by exhibiting low electrical resistivity. Such materials can be advantageously used in various applications, for example in the manufacture of electrochemical cells such as lithium ion batteries or as conductive additive in polymer composite materials. The disclosure also describes a procedure for making such a material as well as well as downstream uses and products comprising said carbon black material.

21 Claims, 2 Drawing Sheets

HIGH-CONDUCTIVE CARBON BLACK WITH LOW VISCOSITY

CLAIM FOR PRIORITY

This application is a U.S. national phase entry under 35 U.S.C. § 371 from PCT International Application No. PCT/EP2016/066343, filed Jul. 8, 2016, which claims the benefit of priority of EP Application No. 15176181.4, filed Jul. 9, 2015, to both of which this application claims priority and both of which are incorporated herein by reference.

FIELD OF THE DISCLOSURE

The present disclosure relates to novel carbon black materials characterized by a good retention of their structure in the compressed state, as shown, e.g., by a relatively high ratio of compressed oil absorption number to uncompressed oil absorption number (cOAN/OAN). The materials may inter alia be characterized by a low viscosity in dispersions and by exhibiting low electrical resistivity. Such materials can be advantageously used in various applications, for example in the manufacture of electrochemical cells such as lithium ion batteries or as conductive additive in polymer composite materials. The disclosure also describes a procedure for making such a material as well as well as downstream uses and products comprising said carbon black material.

BACKGROUND

Carbon black is the generic name for a family of small size, mostly amorphous or paracrystalline carbon particles grown together to aggregates of different sizes and shapes.

Carbon black is generally formed in the gas phase by the thermal decomposition of hydrocarbons from various sources. The energy for the thermal decomposition can be taken by burning fuel like oil or gas, or by burning part of the feedstock used for the decomposition process with sub-stoichiometric amount of air. There are two principles for the thermal decomposition, the first is a thermal decomposition in the absence of oxygen, while the second is a thermal-oxidative decomposition (incomplete combustion), see, for example, Kühner G, Voll M (1993) Manufacture of Carbon Black. In: Donnet J-B, Bansal R C and Wang M-J (eds) Carbon Black—Science and Technology, $2^{nd}$ edn. CRC Taylor & Francis, Boca Raton-London-New York, ch. 1, pp 1-64.

Carbon black imparts electrical conductivity to an insulating or semi-conductive matrix. Usually the matrix percolates from a non- or low-conductive state to a conductive state at a concentration at which the conductive pathway in the matrix is established. Conductive carbon black grades achieve this so-called percolation effect at lower critical concentrations than conventional carbon black. This is related to their high carbon black structure which is established by the complex arrangement of the spherical primary particles to chemically bound branched or chain-like aggregate that again agglomerate to larger agglomerates by electrostatic forces. The void volume created by these agglomerated carbon black aggregates is a measure for the carbon black structure and can be characterized by the so-called oil absorption number (OAN). The carbon black structure in the compressed state of the carbon black material is characterized by a parameter called compressed oil absorption number (cOAN). The retention of the carbon black structure in the compressed state indicates the stability of the carbon black structure towards shear energy. The carbon black concentration to overcome the percolation threshold in a polymer matrix is usually (inversely) dependent on the cOAN, i.e. it is lower with an increased cOAN.

Conductive carbon black grades are used as conductive additives in various applications, for example in electrodes of electrochemical cells like lithium-ion cells. As they do not contribute to the electrochemical process providing the electrochemical cell capacity, the concentration of such conductive additives is typically sought to be minimized. However, carbon black grades offering a sufficiently high conductivity (i.e. low resistivity) even when present in low concentrations often exhibit a high surface area, which is disadvantageous in terms of their electrochemical behavior and their processing and handling properties. With an increasing external surface area of the carbon black conductive additive, the electrode surface area that is wetted by the electrolyte will be enlarged which usually increases the charge losses linked to parasitic side reactions. In the electrode manufacturing process, a water- or solvent-based dispersion of the electrode materials is typically prepared and used to coat the electrode on metal foil current collectors. However, because of the high surface area, conductive or extra-conductive carbon blacks are normally difficult to disperse in the liquid media and cause undesirable high viscosities, presumably due to the adsorption of solvent at the carbon black surface.

Also in the compounding process of thermoplastic polymers, conductive carbon black grades with low surface area show advantages in the dispersion into the polymer matrix. For example, they do not increase the compound viscosity to the same level as high surface area carbon blacks.

Having regard to the situation as discussed above, it is therefore an object of the invention to provide novel carbon black materials exhibiting improved overall properties, particularly when used as conductive additive in various applications, such as in the electrodes of lithium ion batteries.

SUMMARY

It has now been surprisingly found that it is possible to prepare carbon black materials that exhibit relatively low electrical resistivity, e.g., compared to low-BET specific surface area (BET SSA) carbon blacks which have a higher resistivity than high BET SSA carbon blacks, without at the same time increasing the viscosity of dispersions containing said carbon black materials. Without wishing to be bound by any theory, it is believed that the carbon black materials described herein combine otherwise mutually exclusive properties (e.g. achieving (low) viscosity and low electrical resistivity). The combination of favorable properties may be explained by the morphology of the carbon black particles, which, inter alia, includes a relatively high cOAN/OAN and a non-negligible fraction of micropores (defined by a diameter of less than 2 nm).

Thus in a first aspect, the present disclosure relates to a carbon black material which can be characterized by a ratio of cOAN/OAN of at least about 40%, or at least about 45%.

Moreover, the material may be further characterized by a BET SSA of between about 80 and about 400 $m^2/g$, or between about 80 and about 300 $m^2/g$, or between 100 and about 250 $m^2/g$. Alternatively or in addition, the carbon black material can be characterized by having a detectable content of micropores, preferably wherein the micropore area is between 5 and 250 $m^2/g$.

In some embodiments of this aspect of the invention, the carbon black material may be, alternatively or in addition, characterized by having (i) a powder electrical resistivity, when present in a powder comprised of 2 wt. % of said carbon black material in 98 wt. % Lithium Nickel Manganese Cobalt Oxide (NMC) of between about 45 and about 200 Ω·cm, or between about 50 and about 190 Ω·cm, or between about 60 and about 170 Ω·cm; or (ii) an electrode resistivity, when determined in an electrode containing a film comprised of 1 wt. % of said carbon black material, 2 wt. % of PVDF binder in 97 wt. % NMC, of between about 40 and about 180 Ω·cm, or between about 45 and about 170 Ω·cm, or between about 50 and about 160 Ω·cm;

and further characterized by having (iii) a viscosity, determined in a 5 wt. % dispersion in N-methyl-2-pyrrolidone (NMP) at a shear rate of 13 s$^{-1}$, of below about 5000, or below 4000, below 3000 mPa·s.

Another aspect of the invention relates to a process for making a carbon black material as described herein, wherein the process comprises a thermal-oxidative decomposition by feeding (preferably liquid or gaseous) hydrocarbons, such as coal tar oil, steam and cat cracker oil, natural gas, heavy fractions of petrochemical distillation residues, or mixtures of any of these materials, together with sub-stoichiometric amounts of air and/or steam into a reactor, thereby causing the decomposition of the gasified hydrocarbons at a temperature of between about 1000° C. and about 1600° C., for instance from 1400 and 1500° C. or from 1450 to 1550° C., and forming the carbon black materials in the presence of oxidative species such as $O_2$, $CO_2$, $H_2O$, or mixtures thereof.

Carbon black materials obtainable by the process described herein represent another aspect of the present disclosure.

Yet another aspect of the present disclosure include conductive compositions comprising the carbon black material as described and defined in the present disclosure. These conductive compositions may optionally further include other carbon blacks, fine graphite, exfoliated graphite, nano-graphite, sub-micron graphite, exfoliated graphite, graphene, carbon nano-tubes, and/or carbon fibers.

Conductive polymer composite materials comprising the carbon black material or the conductive compositions as defined herein represent a further aspect of the present disclosure.

The use of the carbon black material or the conductive compositions as defined herein in a lithium ion battery is a further aspect of the present disclosure.

Finally, an electrode of an electrochemical cell, a lithium ion battery, an energy storage device, a carbon brush, an electric vehicle, hybrid electric vehicle, or plug-in hybrid electric vehicle comprising a lithium ion battery, a ceramic, a ceramic precursor material, a green material, or a liquid dispersion comprising the carbon black material or the conductive compositions as defined herein represent further aspects of the disclosure.

DETAILED DESCRIPTION OF THE INVENTION

The novel, advantageous carbon black materials described herein were discovered by varying the oxidative species formed in the thermal-oxidative decomposition process for producing carbon black materials. In general, the carbon black materials of the present disclosure show better overall properties than commercial low surface area conductive carbon black materials typically used as conductive additives in, e.g., lithium-ion batteries or as fillers in conductive polymers. In particular, the carbon black materials described herein exhibit excellent (i.e. relatively low) electrical resistivities, both as a powder and when present as an additive in, e.g., an electrode, while at the same time exhibiting a relatively low external surface area. These characteristics lead, for example, to advantageous properties in terms of viscosity, i.e. the viscosity of a slurry comprising the carbon black material described herein, e.g., in N-methyl-2-pyrrolidone (NMP) remains sufficiently low despite the excellent resistivity behavior.

In the prior art, low (electrical) resistivity has typically been achieved by selecting carbon blacks with a high BET specific surface area (BET SSA). However, it has been observed that a high BET SSA of the carbon black material typically leads to a quite remarkable increase in the viscosity of dispersions comprising said carbon black material in a suitable liquid (such as NMP or water), which is a relevant downside during processing.

These process-related disadvantages associated with high surface area carbon blacks have been overcome by the provision of the carbon black materials as described herein which appear to share the good conductivity of high BET SSA carbon blacks while sharing the low viscosity of low-BET SSA materials which, however, have an overall higher electrical resistivity.

More specifically, it has now been achieved to produce carbon black materials that generally have an increased BET SSA (over other low-BET SSA materials having an acceptable viscosity), but without expanding too much the external surface area of the material (which is the surface that comes in contact with its surroundings, e.g. the electrolytes in a lithium ion battery). In other words, the carbon black materials as described herein typically exhibit an increased BET SSA, but the increase of said BET SSA is achieved mostly by an increase of the microporosity of the material, and not by the increase of the geometrical surface area (e.g. by decreasing the primary particle size) and of the mesopores.

Micropores are usually so small (i.e. <2.0 nm) that they are not wetted by liquids. Thus, carbon black materials characterized by having such micropores exhibit only a relatively small wettable electrode surface area, which in turn limits the viscosity increase typically observed for high BET SSA carbon black materials when present in a liquid or thermoplastic dispersion. In other words, micropores generally appear to represent a significant fraction of the total surface area of the carbon black material described herein.

The existence of micropores in the carbon black materials described in this disclosure is also supported by a generally observed lower xylene density compared to low BET SSA carbon black materials as the xylene cannot enter the micropores. Due to this effect, the xylene density rather underestimates the true density of the material. The carbon black materials of the present disclosure also generally exhibit a higher compressed oil absorption number (cOAN) than conventional conductive carbon black grades with low BET SSA, thereby leading to lower electrode resistivities at low carbon black concentrations (e.g. 1 wt. %).

Conductive Carbon Black Materials

Accordingly, in a first aspect, the present disclosure relates to a carbon black material which can be characterized by a ratio of cOAN/OAN of at least about 40%, i.e. the oil absorption in the compressed state is at least a factor of 0.4 of the corresponding (uncompressed) oil absorption number. In some embodiments, the cOAN/OAN ratio is at least about 45%, at least about 50%, at least about 55% or at least about 60%. In certain embodiments, the cOAN/OAN ratio may be at least above 40% but lower than 75%, or lower than 70% or lower than 65%. As explained above, a higher cOAN and thus higher cOAN/OAN ratio indicates a carbon black material that retains to a large extent its structural integrity after compression.

The carbon black material may be further characterized by a BET SSA of between about 80 and about 400 m$^2$/g. In some embodiments, the BET SSA will be between 80 and about 300 m$^2$/g, or between 100 and about 250 m$^2$/g.

Alternatively or in addition, the carbon black material may be characterized by having micropores, i.e. the carbon black includes a detectable, and preferably a sizeable amount of micropores. In certain embodiments, the carbon black material may be characterized by a micropore area of between about 5 and about 250 m$^2$/g, or between 10 and 150 m$^2$/g, or between 10 and 100 m$^2$/g, or between 20 and 80 m$^2$/g.

Alternatively or in addition, the carbon black material may be further characterized by a cOAN of between about 100 and about 250 (ml/100 g). In some embodiments, the cOAN is between about 120 and about 200 (ml/100 g), or between about 120 and about 180 (ml/100 g).

Alternatively or in addition, the carbon black material may be further characterized by an OAN of between about 150 and about 350 (ml/100 g). In certain embodiments, the OAN may range between about 150 and about 330 (ml/100 g), or between about 150 and about 300 (ml/100 g), or between about 200 and about 300 (ml/100 g), or between about 250 and about 300 (ml/100 g).

Alternatively or in addition, the fraction of micropores of the carbon black material is at least about 0.10, or at least 0.15, or at least 0.20, or at least 0.25, or at least 0.30. It will be understood that the fraction of micropores must always be below 1.0 since any particulate material will necessarily have a surface (and thus mesopores). Hence, in practice, a fraction of micropores exceeding a value of 0.7 or even 0.5 is rarely achievable.

Alternatively or in addition, the carbon black material may be characterized by an external surface area based on the statistical thickness method (STSA) of between about 70 and about 300 m$^2$/g. In certain embodiments, the STSA is between about 80 and about 200 m$^2$/g, or between about 90 and about 180 m$^2$/g, or between about 90 and about 150 m$^2$/g.

Alternatively or in addition, the carbon black material may be characterized by a pore size of the intra-aggregate porosity ("IF"), determined by mercury intrusion porosimetry as described in more detail in the Methods section, of between about 35 and about 70 nm. In certain embodiments, the material is characterized by a pore size of the intra-aggregate porosity ("IF") of between about 40 and about 65 nm, or between about 48 and about 62 nm, or between about 50 and about 60 nm.

Alternatively or in addition, the carbon black material may be characterized by a xylene density of between about 1.8000 and 2.0000 g/cm$^3$, or between about 1.8100 and 1.9500 g/cm$^3$ or between about 1.8200 and 1.8800 g/cm$^3$. In some embodiments, the xylene density will range from about 1.8100 to about 1.8700 g/cm$^3$, or from about 1.8200 to about 1.8600 g/cm$^3$. Without wishing to be bound by any theory, it is believed that the relatively low apparent xylene densities of some carbon black materials as described herein are due to the fact that xylene cannot "access" the micropores in the carbon black particles.

Alternatively or in addition, the carbon black material may be characterized by an interlayer spacing c/2 of between about 0.3580 and about 0.3640 nm. In certain embodiments, the interlayer spacing c/2 will be between about 0.3590 and about 0.3630 nm, or between about 0.3600 and about 0.36200 nm, or between about 0.3600 and about 0.3615 nm.

The carbon black material according to the present invention may be further characterized by any one the following, functional properties:

(i) a powder electrical resistivity, when present in a powder comprised of 2 wt. % of said carbon black material in 98 wt. % Lithium Nickel Manganese Cobalt Oxide (NMC), of between about 45 and about 200 Ω·cm. In some embodiments the resistivity may be between about 50 and about 190 Ω·cm, or between about 60 and about 180 Ω·cm, or between about 60 and about 170 Ω·cm, or between about 65 and 160 Ω·cm;

(ii) an electrode resistivity of between about 400 and about 1200 Ω·cm, or between about 500 and about 1000 Ω·cm when determined in an electrode containing a film comprised of 1 wt. % of said carbon black material, 3 wt. % of a PVDF binder, and 96 wt. % NMC (2-point measurement); and/or (ii) an electrode resistivity of between about 30 and about 210 Ω·cm, or between about 40 and about 180 Ω·cm when determined in an electrode containing a film comprised of 1 wt. % of said carbon black material, 2 wt. % of a PVDF binder, and 97 wt. % NMC (4-point measurement). In some embodiments, the electrode resistivity may be between about 45 and about 170 Ω·cm, or between about 50 and about 160 Ω·cm; and/or (iii) a volume electrical resistivity in high density polyethylene (HDPE) of between about 100 to about 1000 Ω·cm, or between about 120 to about 600 Ω·cm, when present at 12.5 wt %, and/or between about 10 to about 100 Ω·cm, or between about 20 to about 80 Ω·cm, when present at 15 wt %; and/or (iv) a viscosity, determined in a 5 wt. % dispersion in 95 wt. % N-methyl-2-pyrrolidone (NMP) at a shear rate of 13 s$^{-1}$, of below about 5000 mPa·s. In certain embodiments, the viscosity in such a system is below 4000, below 3000, below 2500, below 2300, below 2100, or even below 2000 mPa·s.

Suitable methods for determining the above parameters are generally known in the art and, where appropriate, described in greater detail in the Methods section infra.

In one embodiment of this aspect of the disclosure, the carbon black material is characterized by any two of the parameters set out above. In other embodiments the carbon black material is characterized by any three, or four, or five, or six, or seven, or eight, or nine, or ten, or eleven, or twelve of the parameters set out above. The carbon black material can in principle also be characterized by all parameters listed above.

In yet another embodiment of this aspect of the disclosure, the carbon black material is characterized by any of the parameters (i) [powder resistivity] or (ii) [electrode resistivity], together with parameter (iii) [viscosity in a dispersion].

A carbon black material may alternatively be defined by parameters [viscosity in a dispersion] and [ratio of cOAN/OAN], optionally together with parameter [micropore area], and/or [fraction of micropores]. Further possible combinations of parameters contemplated herein can be found in the appended numbered embodiments and the claims. In any event, it will be understood that any possible combination of the above parameters may be used to define the carbon black material of the present disclosure.

Process for Preparing Carbon Black Materials as Defined Herein

The present disclosure also relates to a process for preparing the novel carbon black materials described in the present disclosure.

Thus, in one embodiment of this aspect of the disclosure, the process for the preparation of the carbon black material described herein comprises a thermal-oxidative decomposition by feeding hydrocarbons with high degree of aromaticity (preferably liquid or gaseous), such as coal tar oil, ethylene tar, cat cracker oil, natural gas, heavy fractions of petrochemical distillation residues, or mixtures of any of these materials together with sub-stoichiometric amounts of air and/or steam into a reactor, thereby causing the decomposition of the gasified hydrocarbons at a temperature of between about 1000° C. and about 1600° C., for instance from 1400 and 1500° C. or from 1450 to 1550° C., and forming the carbon black materials in the presence of oxidative species such as $O_2$, $CO_2$, $H_2O$, or mixtures thereof.

The reaction time in the reactor is typically from less than a second up to a few seconds, though it will be appreciated that the exact conditions depend on the carbon source and the reactor employed for the generation of the carbon black material.

Carbon Black Materials Prepared According to the Process Described Herein

Another aspect of the present invention is related to a carbon black material that is obtainable by the process described herein. Preferably, the carbon black material can be further characterized by any one of the product parameters for defining the carbon black material described herein above or in the appended claims.

Conductive Compositions Comprising the Carbon Black Materials as Defined Herein

Conductive compositions comprising the carbon black materials as defined herein represent another aspect of the present disclosure. In some embodiments, the conductive composition may further comprise other carbon black materials, fine graphite, exfoliated graphite, nano-graphite, sub-micron graphite, exfoliated graphite, graphene, carbon nano-tubes, carbon fibers, or mixtures thereof.

Use of the Carbon Black Materials or the Conductive Compositions as Defined Herein Since the carbon black materials as defined herein exhibit excellent electrochemical, mechanical and rheological properties, yet another aspect of the present disclosure relates to the use of said carbon black materials as an additive in various downstream applications, e.g. in electrochemical cells, such as lithium ion batteries or fuel cells, or as an additive in electrically conductive polymers, conductive coatings, carbon brushes, hard metals (WC production), and UV stabilizers.

Downstream Products Employing the Carbon Black Materials as Defined Herein

Consequently, electrodes of an electrochemical cell, such as a lithium ion battery or a fuel cell, comprising the carbon black material or the conductive composition as defined herein represent another aspect of the present invention. The present invention also relates to lithium ion batteries comprising the carbon black material or the conductive composition as defined herein In another aspect, the present disclosure relates to a conductive polymer composite material comprising the carbon black material or the conductive composition as defined herein. In some embodiments, the weight ratio of the carbon black material in the polymer composite is between 5 and 95% by weight, or between 10 and 85% or between 20 and 50% by weight of the total composition.

In yet another aspect, the present invention relates to an energy storage device comprising the carbon black material or the conductive composition as defined herein.

A further aspect of the present invention relates to a carbon brush comprising the carbon black material or the conductive composition as defined herein.

An electric vehicle, hybrid electric vehicle, or plug-in hybrid electric vehicle which comprises a lithium ion battery, wherein the lithium ion battery comprises the carbon black material or the conductive composition as defined herein represents another aspect of the present disclosure.

In addition, a ceramic, ceramic precursor material, or a green material comprising the carbon black material or the conductive composition as defined herein as a pore forming material are another aspect of the present disclosure.

Finally, yet another aspect of the present disclosure relates to a dispersion comprising a liquid, such as N-methyl-2-pyrrolidone (NMP), water or water-based solvent mixtures, and the carbon black material or the conductive composition as defined herein. Such dispersions may be furthermore characterized by their favorable (i.e. relatively low) slurry viscosity. Thus, in some embodiments, the viscosity of a dispersion comprising 5 wt % of a carbon black material as defined herein in N-methyl-2-pyrrolidone (NMP) (after 25 min of stirring at 2500 RPM and at a shear rate of 13*1/s) is typically below about 5000, and or below 4000, below 3000 mPa/s, or even below 2500 mPa/s.

The dispersion may optionally further contain other carbon black materials, fine graphite, exfoliated graphite, nano-graphite, sub-micron graphite, exfoliated graphite, graphene, carbon nano-tubes, carbon fibers, or mixtures thereof. In such embodiments, the carbon black material as defined herein is present in an amount ranging from 10 to 99 wt. % of the total amount of carbonaceous particles, or 20 to 90% of the total amount of carbonaceous particles, or 30 to 85 wt. % of the total amount carbonaceous particles.

Suitable methods for determining the various properties and parameters used to define the carbon black products described herein are set out in more detail below.

Measurement Methods

The percentage (%) values specified herein are by weight, unless specified otherwise.

Oil Absorption Number

Paraffin oil is added by means of a constant-rate burette to a dried (1 h at 125° C.) carbon black sample in the mixer chamber of the absorptometer. As the sample absorbs the oil, the mixture changes from a free-flowing state to one of a semi-plastic agglomeration, with an accompanying increase in viscosity. This increased viscosity is transmitted to the torque-sensing system. When the viscosity reaches a predetermined torque level, the absorptometer and burette will shut off simultaneously. The volume of the added oil is read from the burette. The volume of oil per unit mass of carbon black is the oil absorption number.

For the carbon black materials described herein, the OAN value was measured according to ASTM D2414-14, procedure A with the following parameters: paraffin oil, 10 g carbon black, and torque limit switch at 400 mN·m.
Reference: ASTM D2414-14

Compressed Oil Absorption Number

A sample of carbon black is compressed and then tested in an absorptometer to determine the oil absorption number according to method ASTM D2414-01. The difference between the initial OAN number and the OAN number of the compressed sample reflects the stability of the structure of that sample.

For the carbon black materials described herein, the cOAN value was measured according to ASTM D3493-14 with the following parameters: Paraffin oil, compression 4 times at a pressure of 165 MPa.
Reference: ASTM D3493-14

Absorption Stiffness Volume (AS Test)

This test determines the amount of liquid (10% of acetone in water) which can be absorbed by 5 grams of carbon black. The carbon black is placed in a 500 ml Erlenmeyer flask. While shaking vigorously with a rotating motion, small quantities of liquid are added to the carbon until finally one ball is formed. At first, this ball is fragile and breaks when shaking but at the end the ball resists to fairly vigorous shaking without disintegrating. The quantity of liquid added during this time is counted and the test is expressed in ml/5 g.
Reference: Internal method Specific BET Surface Area, STSA (Statistical Thickness Surface Area, or External Surface Area), Micropore Area and Fraction of Micropores The measurements were carried out on a Micromeritics ASAP2020 Physisorption Analyzer. The method is based on the registration of the adsorption isotherm of liquid nitrogen in the range p/p0=0.01-0.30, at 77 K. Following the procedure proposed by Brunauer, Emmet and Teller (Adsorption of Gases in Multimolecular Layers, *J. Am. Chem. Soc.*, 1938, 60, 309-319), the monolayer capacity can be determined. On the basis of the cross-sectional area of the nitrogen molecule, the monolayer capacity and the weight of sample, the specific surface the t-plot micro-pore area and fraction of micro-pores of the sample were then calculated.

$T$-Plot micropore area=BET SSA STSA

Fraction of micro-pores=$t$-plot micro-pore area/BET SSA

Reference: ASTM D6556-14

Xylene Density

The analysis is based on the principle of liquid exclusion as defined in DIN 51 901. Approx. 2.5 g (accuracy 0.1 mg) of powder is weighed in a 25 ml pycnometer. Xylene is added under vacuum (15 Torr). After a few hours dwell time under normal pressure, the pycnometer is conditioned and weighed. The density represents the ratio of mass and volume. The mass is given by the weight of the sample and the volume is calculated from the difference in weight of the xylene filled pycnometer with and without sample powder.
Reference: DIN 51 901

X-Ray Diffraction

XRD data were collected using a PANalytical X'Pert PRO diffractometer coupled with a PANalytical X'Celerator detector. The diffractometer has following characteristics shown in the table below:

TABLE

Instrument data and measurement parameters

| Instrument | PANalytical X'Pert PRO |
|---|---|
| X-ray detector | PANalytical X'Celerator |
| X-ray source | Cu-K$_\alpha$ |
| Generator parameters | 45 kV - 40 mA |
| Scan speed | 0.07°/s (for L$_c$ and c/2) |
| Divergence slit | 1° (for L$_c$ and c/2) |
| Sample spinning | 60 rpm |

The data were analyzed using the PANalytical X'Pert HighScore Plus software.

Interlayer Spacing c/2

The interlayer space c/2 is determined by X-ray diffractometry. The angular position of the peak maximum of the [002] reflection profile is determined and, by applying the Bragg equation, the interlayer spacing is calculated (Klug and Alexander, X-ray diffraction Procedures, John Wiley & Sons Inc., New York, London (1967)). The measuring procedure is the same as for the determination of Crystallite Size Lc described later which is derived from the ASTM D5187-10 used for the Calcined Petroleum Cokes.

Crystallite Size $L_c$

Crystallite size is determined by analysis of the [002] diffraction profile and determining the width of the peak profile at the half maximum. The broadening of the peak should be affected by crystallite size as proposed by Scherrer (P. Scherrer, Göttinger Nachrichten 2, 98 (1918)). For the present invention, the method described in ASTM D5187-10 for calcined petroleum cokes was adapted for the carbon black materials described herein.

Pore Size of Intra-Aggregate Porosity (IF)

The pore size of the intra-aggregate porosity, IF, was measured by mercury porosimetry. The carbon material (0.02-0.3 g) was placed in the high pressure chamber of the device (Micromeritics Autopore III) and the analysis was made with mercury pressures up to 60,000 psia (4137 bar). The pore size distribution is obtained by applying the Washburn equation with the contact angle of mercury being 130°, the surface tension 485*10-3 N/m and the mercury density 13.5335 g/ml. The IF is defined as the peak position in the log differential intrusion plot.
Reference: ISO 15901-1:2005(E)

Viscosity

Slurries comprising 5 wt % of the carbon black material in N-methyl-2-pyrrolidone (NMP) (e.g. 2.5 g of CB were dissolved in 47.5 g of NMP) were prepared using a dissolver disc (disc diameter: 4.5 cm, container diameter: 6.5 cm) for 25 minutes at 2500 rpm. a mechanical stirrer. The rheology of the dispersion was measured using a Molecular Compact Rheometer MCR302 (Physica, Germany) equipped with a cone/plate-measuring system (cone diameter: 5 cm, cone angle: 2°) at a shear rate of 13 s$^{-1}$ and expressed in mPa·s. The measuring temperature was 20° C.

Reference: DIN 3219
Powder Resistivity @ 4.5 kN/cm$^2$ (2 wt. % CB in 98 wt. % NMC)

0.2 g of Carbon Black and 9.8 g of commercially available Lithium Nickel Manganese Cobalt Oxide (NMC) powder were dispersed in acetone using a high shear energy laboratory mixer, ensuring an adequate homogenization of the powder components. Acetone was removed by drying the samples at 80° C. overnight. 2 g of each dry powder mixture were compressed inside an insulating die (a ring made of glass fiber reinforced polymer having an inner diameter of 11.3 mm and inserted into a larger ring made of steel for additional mechanical support) between two electrified pistons made of brass (diameter: 1.13 cm). The applied force was controlled during the experiment, while the relative position of the pistons in the die (i.e. the height of the powder sample) was measured using a length gauge. The voltage drop across the sample at known, constant current was measured in situ at a pressure of 4.5 kN/cm$^2$ using the pistons as the electrodes (2-point resistance measurement). The sample resistance was calculated using Ohm's law, assuming that the contact resistances between pistons and the sample can be neglected (the calculated resistance was ascribed entirely to the sample). The sample resistivity was calculated using the nominal inner diameter of the mold (1.13 cm) and the measured sample height, and expressed in Ω·cm. During the experiment the polymeric ring deformed elastically as a consequence of the lateral expansion (transverse strain) of the sample. The elastic deformation of the polymeric ring was almost negligible at pressures equal to or lower than 4.5 kN cm$^{-2}$ and can be neglected for comparative purposes.

REFERENCES

Probst, Carbon 40 (2002) 201-205
Grivei, KGK Kautschuk Gummi Kunststoffe 56. Jahrgang, Nr. 9/2003
Spahr, Journal of Power Sources 196 (2011) 3404-3413
Electrode Resistivity 2-point (1 wt. % CB, 3 wt. % PVDF binder, 96% NMC)

2 g of Carbon Black, 6 g of commercially available polyvinylidene difluoride (PVDF) and 192 g of commercially available Lithium Nickel Manganese Cobalt Oxide (NMC) powder were dispersed in N-methyl-2-pyrrolidone (NMP) using a kneader for about 3 hours at 20 rpm. The PVDF binder had previously been dissolved in NMP (12 wt. %) and subsequently been added to the dry powders. NMP was added to adjust viscosity of the paste for effective kneading, and subsequently added again to dilute the paste to a slurry. The slurry was mixed using a homogenizer for 30 minutes at 2000 rpm. The slurry was coated onto aluminum foil (thickness: 20 μm) by a doctor blade (wet thickness: about 200 μm). The coated foils were dried overnight at 120° C. in vacuum. The through-plane resistance of the coating was measured using a 2-point setup under a pressure of 30 MPa applied on the sample (diameter: 12 mm) using two metallic flat surfaces. The through-plane resistivity was calculated using the samples dimension and the sample thickness (as measured after release of the applied pressure).
Electrode Resistivity 4-Point (1 wt. % CB, 2 wt. % PVDF Binder, 97% NMC)

1 g of Carbon Black, 2 g of commercially available polyvinylidene difluoride (PVDF) and 97 g of commercially available Lithium Nickel Manganese Cobalt Oxide (NMC) powder were dispersed in N-methyl-2-pyrrolidone (NMP) using a dissolver disc (disc diameter: 4.5 cm, container diameter: 6.5 cm) for 20 minutes at 2500 rpm. The PVDF binder had previously been dissolved in NMP (12 wt. %) and subsequently been added to the slurry. The slurry was coated onto Mylar (PET) foil by a doctor blade (wet thickness: 200 μm). The coated foils were dried overnight at 120° C. in vacuum. The in-plane resistance of the coating was measured using a 4-point setup. The in-plane resistivity was calculated using the samples dimensions (2×2 cm) and the measured sample thickness.
Volume Resistivity (Electrical) in HDPE High density polyethylene (HDPE Finathene 47100) compounds were prepared by mixing the polymer melt (160° C.) with a given amount of carbon black using a roller mixer. Compound plates (10×10 cm) were produced by compression molding the compounds at 180° C. while applying a force of 200 kN for two minutes. After molding, the compound plates were cooled to room temperature by water-cooling the stainless steel mold while still applying a force of 200 kN. 2 cm wide samples were cut out of the compound plates for measuring the in-plane resistance using a 4-point setup using a die. The samples were pressed against two wedge-shaped electrodes made of copper (distance between the tips of the wedges: 2 cm) between two insulating plates while applying a force equivalent to 50 kg (490.5 N) in order to ensure a sufficient contact between the sample and the electrodes. The ends of the samples (minimum length: 4 cm) were connected to the other two leads of the 4-point ohm meter having a high internal resistance. The in-plane resistivity was calculated using the samples dimensions (2×2 cm) and the measured sample thickness (between 0.5 and 3 mm).

Having described the various aspects of the present invention in general terms, it will be apparent to those of skill in the art that many modifications and slight variations are possible without departing from the spirit and scope of the present invention. The present invention is furthermore described by reference to the following, non-limiting numbered embodiments.

1. A carbon black material characterized by any two parameters selected from:
   (i) a powder electrical resistivity, when present in a powder comprised of 2 wt. % of said carbon black material in 98 wt. % Lithium Nickel Manganese Cobalt Oxide (NMC) of between about 45 and about 200 Ω·cm, or between about 50 and about 190 Ω·cm, or between about 60 and about 170 Ω·cm;
   (ii) an electrode resistivity, when determined in an electrode containing a film comprised of 1 wt. % of said carbon black material, 2 wt. % of PVDF binder in 97 wt. % NMC, of between about 40 and about 180 Ω·cm, or between about 45 and about 170 Ω·cm, or between about 50 and about 160 Ω·cm;
   (iii) a viscosity determined in a 5 wt. % dispersion in N-methyl-2-pyrrolidone (NMP) at a shear rate of 13 s$^{-1}$ of below about 5000, or below 4000, below 3000 mPa·s;
   (iv) a ratio of cOAN/OAN of at least about 40%, or at least about 45%;
   (v) having micropores, preferably wherein the micropore area is between 5 and 250 m$^2$/g;
   (vi) wherein the fraction of micropores of the carbon black material is at least about 0.10, or at least about 0.15, or at least about 0.2;
   (vii) an OAN of between about 150 and about 350, or between about 150 and about 300, or between about 200 and about 300 (ml/100 g);

(viii) a cOAN of between about 100 and about 250, or between about 120 and about 200, or between about 120 and about 180 (ml/100 g);

(ix) a BET SSA of between about 80 and about 400 m$^2$/g, or between about 80 and about 300 m$^2$/g, or between 100 and about 250 m$^2$/g;

(x) an external surface area based on the statistical thickness method (STSA) of between about 70 and about 300 m$^2$/g, or between about 80 and about 200 m$^2$/g, or between about 90 and about 150 m$^2$/g;

(xi) a pore size of the intra-aggregate porosity, IF, determined by mercury intrusion porosimetry, of between about 35 and about 70 nm, or between 40 and 65 nm, or between 50 and 60 nm;

(xii) a xylene density of between about 1.8100 and about 1.8700, or between about 1.8200 and 1.8600 g/cm$^3$; or (xiii) an interlayer spacing c/2 of between about 0.3580 and about 0.3640 nm, or between about 0.3590 and about 0.3630 nm, or between about 0.3600 and about 0.3620 nm.

2. The carbon black material of embodiment 1, characterized by any 3, 4, 5, 6 or 7 parameters as defined in embodiment 1.

3. A carbon black material characterized by having
(i) a powder electrical resistivity, when present in a powder comprised of 2 wt. % of said carbon black material in 98 wt. % Lithium Nickel Manganese Cobalt Oxide (NMC) of between about 45 and about 200 Ω·cm, or between about 50 and about 190 Ω·cm, or between about 60 and about 170 Ω·cm; or
(ii) an electrode resistivity, when determined in an electrode containing a film comprised of 1 wt. % of said carbon black material, 2 wt. % of PVDF binder in 97 wt. % NMC, of between about 40 and about 180 Ω·cm, or between about 45 and about 170 Ω·cm, or between about 50 and about 160 Ω·cm;
and further characterized by
(iii) a viscosity, determined in a 5 wt. % dispersion in N-methyl-2-pyrrolidone (NMP) at a shear rate of 13 s$^{-1}$, of below about 5000, or below 4000, or below 3000 mPa·s.

4. A carbon black material; characterized by having
(i) a ratio of cOAN/OAN of at least about 40%, or at least about 45%; and
(ii) a viscosity determined in a 5 wt % dispersion in N-methyl-2-pyrrolidone (NMP) at a shear rate of 13 s$^{-1}$ of below about 5000, or below 4000, below 3000 mPa·s.

5. The carbon black material of embodiment 4, wherein the ratio of cOAN/OAN is less than 75%, or less than 70% or less than 65%.

6. The carbon black material of any one of embodiments 3 to 5, further characterized by having micropores, preferably wherein the micropore area is between 5 and 250 m$^2$/g.

7. The carbon black material of any one of embodiments 3 to 6, wherein the fraction of micropores of the material is at least about 0.10, or at least about 0.15, or at least about 0.2.

8. The carbon black material of any one of embodiments 3 to 7, further characterized by
(i) an OAN of between about 150 and about 350, or between about 150 and about 300, or between about 200 and about 300 (ml/100 g); and/or
(ii) a cOAN of between about 100 and about 250, or between about 120 and about 200, or between about 120 and about 180 (ml/100 g).

9. The carbon black material of any one of embodiments 3 to 8, further characterized by
(i) a BET SSA of between about 80 and about 400 m$^2$/g, or between about 80 and about 300 m$^2$/g, or between about 100 and about 250 m$^2$/g; and/or
(ii) an external surface area based on the statistical thickness method (STSA) of between about 70 and about 300 m$^2$/g, or between about 80 and about 200 m$^2$/g, or between about 90 and about 150 m$^2$/g.

10. The carbon black material of any one of embodiments 3 to 9, further characterized by a pore size of the intra-aggregate porosity (IF), determined by mercury intrusion porosimetry, of between about 35 and about 70 nm, or between 40 and 65 nm, or between 50 and 60 nm.

11. The carbon black material of any one of embodiments 3 to 10, further characterized by a xylene density of between about 1.8100 and about 1.8700, or between about 1.8200 and 1.8600 g/cm$^3$.

12. The carbon black material of any one of embodiments 3 to 11, further characterized by an interlayer spacing c/2 of between about 0.3580 and about 0.3640 nm, or between about 0.3590 and about 0.3630 nm, or between about 0.3600 and about 0.3620 nm.

13. The carbon black material of any one of embodiments 3 to 12, further characterized by
(i) a powder electrical resistivity, when present in a powder comprised of 2 wt. % of said carbon black material in 98 wt. % Lithium Nickel Manganese Cobalt Oxide (NMC) of between about 45 and about 200 Ω·cm, or between about 50 and about 190 Ω·cm, or between about 60 and about 170 Ω·cm; and/or
(ii) an electrode resistivity, when determined in an electrode containing a film comprised of 1 wt. % of said carbon black material, 2 wt. % of PVDF binder in 97 wt. % NMC, of between about 40 and about 180 Ω·cm, or between about 45 and about 170 Ω·cm, or between about 50 and about 160 Ω·cm;

14. A process for producing the carbon black material as defined in any one of embodiments 1 to 13, comprising a thermal-oxidative decomposition by feeding liquid or gaseous hydrocarbons such as Coal Tar oil, Steam and Cat Cracker oil, natural gas, heavy fractions of petrochemical distillation residues, or mixtures of any of these materials, together with sub-stoichiometric amounts of air into a reactor, thereby causing the decomposition of the gasified hydrocarbons at a temperature of between about 1000° C. and about 1600° C., for instance from 1400 and 1500° C. or from 1450 to 1550° C., and forming the carbon black materials in the presence of oxidative species such as $O_2$, $CO_2$, $H_2O$, or mixtures thereof.

15. A carbon black material obtainable by the process of embodiment 14, preferably wherein the carbon black material is one as defined in any one of embodiments 1 to 13.

16. A conductive composition comprising the carbon black material according to any one of embodiments 1 to 13 or 15, optionally further comprising another carbon black, fine graphite, exfoliated graphite, nano-graphite, submicron graphite, exfoliated graphite, graphene, carbon nano-tubes, and/or carbon fibers.

17. A conductive polymer composite material comprising the carbon black material according to any one of embodiments 1 to 13 or 15 or the conductive composition according to embodiment 16.

18. Use of the carbon black material according to any one of embodiments 1 to 13 or 15 or the conductive composition according to embodiment 16 in a lithium ion battery.

19. An electrode of an electrochemical cell comprising the carbon black material according to any one of embodiments 1 to 13 or 15 or the conductive composition according to embodiment 16.
20. A lithium ion battery comprising the carbon black material according to any one of embodiments 1 to 13 or 15 or the conductive composition according to embodiment 16 as a conductive additive.
21. An energy storage device comprising the carbon black material according to any one of embodiments 1 to 13 or 15 or the conductive composition according to embodiment 16.
22. A carbon brush comprising the carbon black material according to any one of embodiments 1 to 13 or 15 or the conductive composition according to embodiment 16.
23. An electric vehicle, hybrid electric vehicle, or plug-in hybrid electric vehicle comprising a lithium ion battery, wherein said lithium ion battery comprises the carbon black material according to any one of embodiments 1 to 13 or 15 or the conductive composition according to embodiment 16.
24. A ceramic, ceramic precursor material, or a green material comprising the carbon black material according to any one of embodiments 1 to 13 or 15 or the conductive composition according to embodiment 16 as a pore forming material.
25. A dispersion comprising a liquid and a the carbon black material according to any one of embodiments 1 to 13 or 15 or the conductive composition according to embodiment 16.

EXAMPLES

Example 1

Several carbon black samples were made in a furnace black process based on the thermal-oxidative decomposition of coal tar oil (CB1, CB2, CB3) or ethylene tar (CB4, CB5) which were co-injected with sub-stoichiometric amounts of air and steam into the reactor, followed by adjustment of the oxidant/hydrocarbon ratio to heat the reactor to a temperature of between 1450 and 1550° C., causing the endothermic decomposition of the gasified hydrocarbons and forming the carbon black materials from the resulting carbon fragments inside the reactor.

These carbon black samples, as well as some comparative examples were characterized in terms of the following parameters: Oil absorption number, compressed oil absorption number, absorption stiffness, BET SSA, statistical thickness surface area (STSA, essentially corresponding to the external surface area), the micropore area and the fraction of micropores. The results are summarized in Table 1 below.

TABLE 1

Carbon Black Properties

| | OAN | cOAN | cOAN/OAN | AS (Absorption stiffness) | BET SSA | t-Plot micropore area (ASTM): | Fraction micropores (ASTM) | STSA (external surface area) (ASTM) |
|---|---|---|---|---|---|---|---|---|
| Unit | ml/100 g | ml/100 g | % | ml/5 g | m²/g | m²/g | % | m²/g |
| CB | | | | | | | | |
| CB1 | 273 | 137 | 50.2 | 31 | 131 | 31 | 23 | 100 |
| CB2 | 287 | 130 | 45.3 | 32 | 135 | 42 | 31 | 93 |
| CB3 | 283 | 158 | 55.8 | 33 | 209 | 77 | 37 | 132 |
| CB4 | 286 | 156 | 54.5 | 28 | 224 | 68 | 30 | 156 |
| CB5 | 284 | 164 | 57.5 | 31 | 243 | 77 | 32 | 166 |
| References | | | | | | | | |
| C-NERGY ™ Super C45 | 339 | 95 | 28.0 | 36 | 44 | 0 | 0 | 44 |
| C-NERGY ™ Super C65 | 287 | 110 | 38.3 | 32 | 63 | 0 | 0 | 63 |
| ENSACO ® 350P | 350 | 280 | 80.0 | 32 | 761 | 281 | 35 | 480 |

Example 2

The same carbon black materials were further characterized in terms of their crystallographic properties (crystallite size $L_c$ and interplanar distance, c/2), and for their mercury intrusion IF peak position. In addition, the xylene density was determined for the tested materials. The results are given in Table 2 below.

TABLE 2

Crystallographic parameters, mercury intrusion IF peak position, xylene density and average primary particle size of various carbon black products

| | Analysis Parameter | | | | |
|---|---|---|---|---|---|
| | $L_c$ | c/2 | Hg Intrusion Peak Position (IF) | Xylene density | Average primary particle size (TEM) |
| Unit | nm | nm | nm | g/cm³ | nm |
| CB | | | | | |
| CB1 | 2 | 0.3608 | 59.6 | 1.858 | 30-40 |
| CB2 | 2 | 0.3612 | 59.5 | 1.825 | 30-40 |
| CB3 | 2 | 0.3611 | 53.5 | 1.859 | 30-40 |
| CB4 | 2 | 0.3604 | 55.2 | 1844 | 30-40 |
| CB5 | 2 | 0.3609 | 52.1 | 1871 | 30-40 |
| References | | | | | |
| C-NERGY™ Super C45 | 2 | 0.3575 | 130.0 | 1.878 | 35-45 |
| C-NERGY™ Super C65 | 2 | 0.3586 | 71.3 | 1.885 | 30-40 |
| ENSACO® 350P | 2 | 0.3594 | 30.0 | 1.953 | 25-35 |

Example 3

The various carbon black materials were also examined with regard to their resistivity (powder and 2 point electrode (film)), as well as their viscosity in a dispersion (5 wt. % in NMP). The results are given in Table 3 below.

TABLE 3

Electrical resistivities and slurry viscosities of various carbon black products

| | Analysis Parameter | | | |
|---|---|---|---|---|
| | Powder Resistivity @ 4.5 kN/cm² (2 wt. % CB, 98 wt. % NMC) | Electrode Resistivity 2-point (1 wt. % CB, 3 wt. % PVDF, 96 wt. % NMC) @ 30 MPa | Electrode Resistivity 4-point (1 wt. % CB, 2 wt. % PVDF, 97 wt. % NMC) | Viscosity @ 13 * s⁻¹ (5 wt. % CB in NMP) |
| Unit | Ω · cm | Ω · cm | Ω · cm | mPa · s |
| CB | | | | |
| CB1 | 176 | 717 | 140 | 1,010 |
| CB2 | 112 | 774 | 38 | 1,820 |
| CB3 | 136 | 651 | 127 | 1,950 |
| CB4 | 132 | 978 | 204 | 2,420 |
| CB5 | 110 | 595 | 151 | 1,980 |
| References | | | | |
| C-NERGY™ Super C45 | 111 | 3882 | 5425 | 1,260 |
| C-NERGY™ Super C65 | 185 | 1576 | 249 | 2,010 |
| ENSACO® 350P | 52 | 258 | 64 | 9,220 |

Example 4

Figure 1:
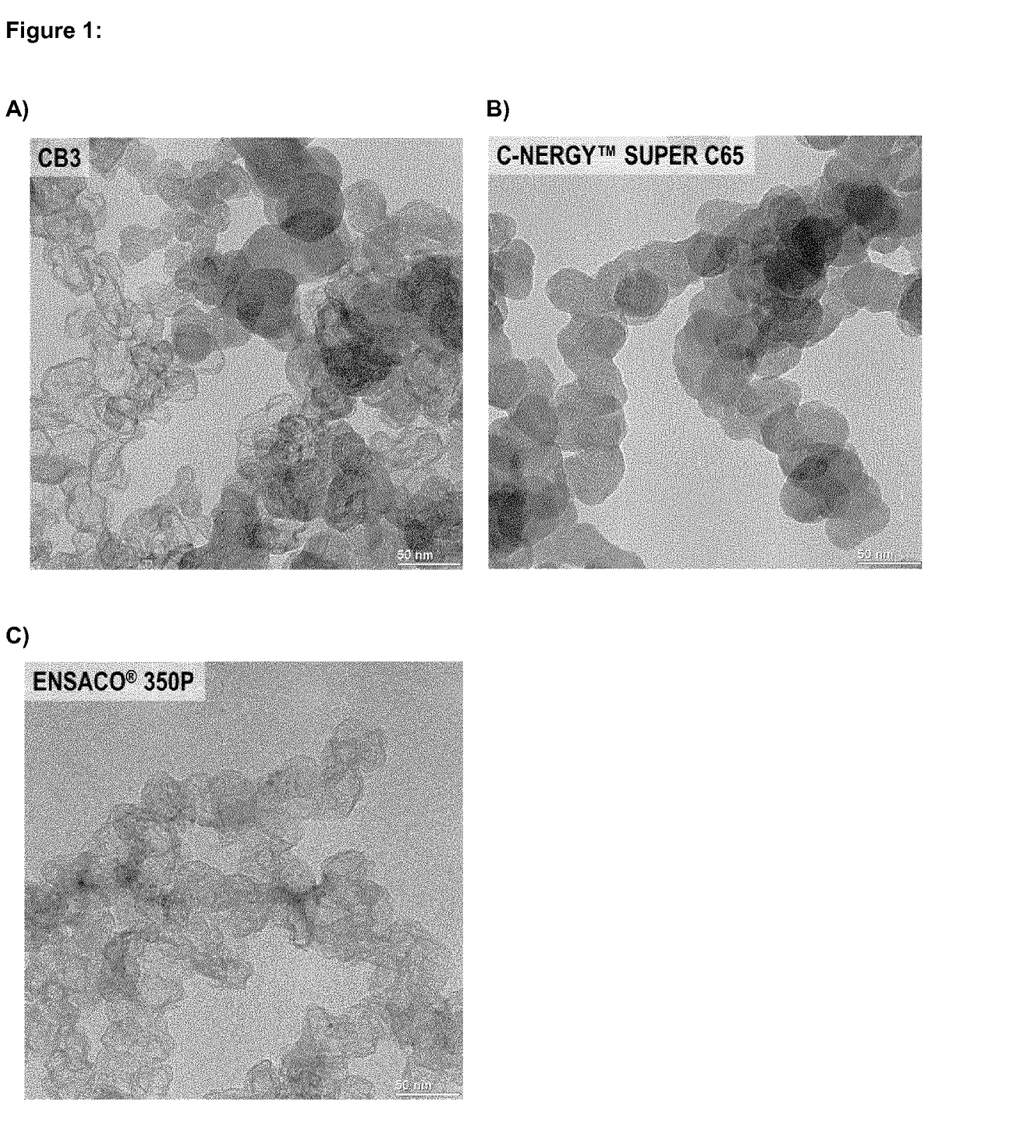
FIG. 1 shows Transmission Electron Microscopy (TEM) images of carbon black CB3 (Panel A), as well as of prior art commercially available carbon black material C-NERGY™ SUPER C65 (Panel B) and Ensaco® 350P (Panel C).
Figure 2:
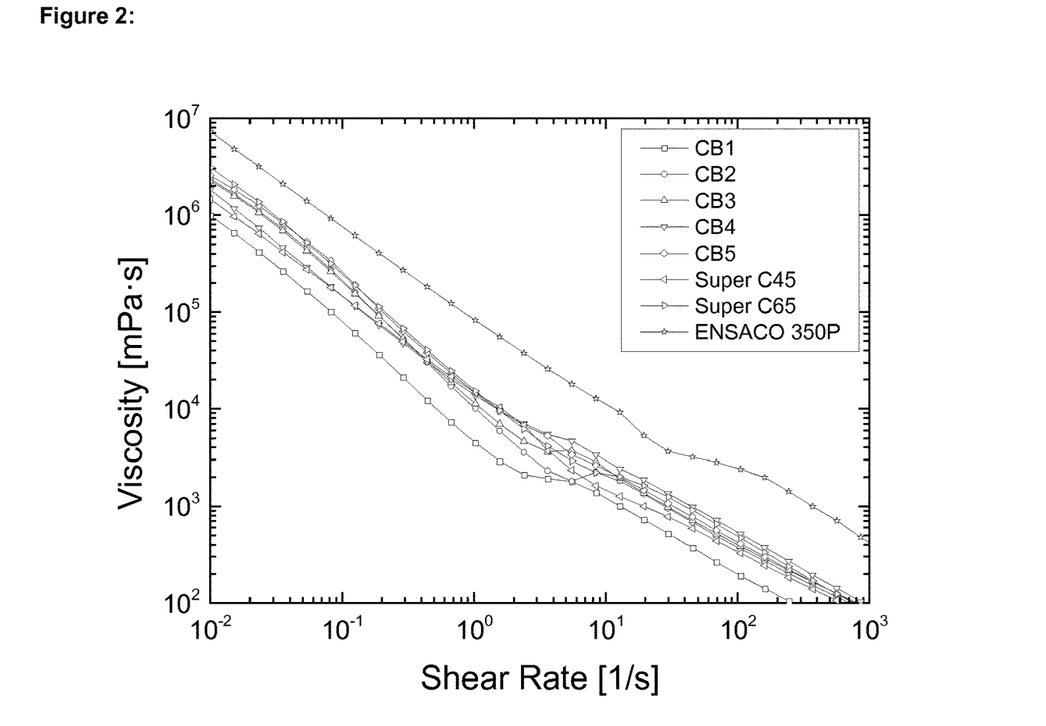
FIG. 2 shows the rheological behavior (viscosity versus shear rate) of various carbon black materials (CB1 CB5), as well as comparative materials C-NERGY™ SUPER C45 and C65 as well as Ensaco® 350P) in a dispersion in N-methyl-2-pyrrolidone (5 wt % CB, 95% NMP) after stirring for 25 minutes at 2500 RPM.
Figure 3:
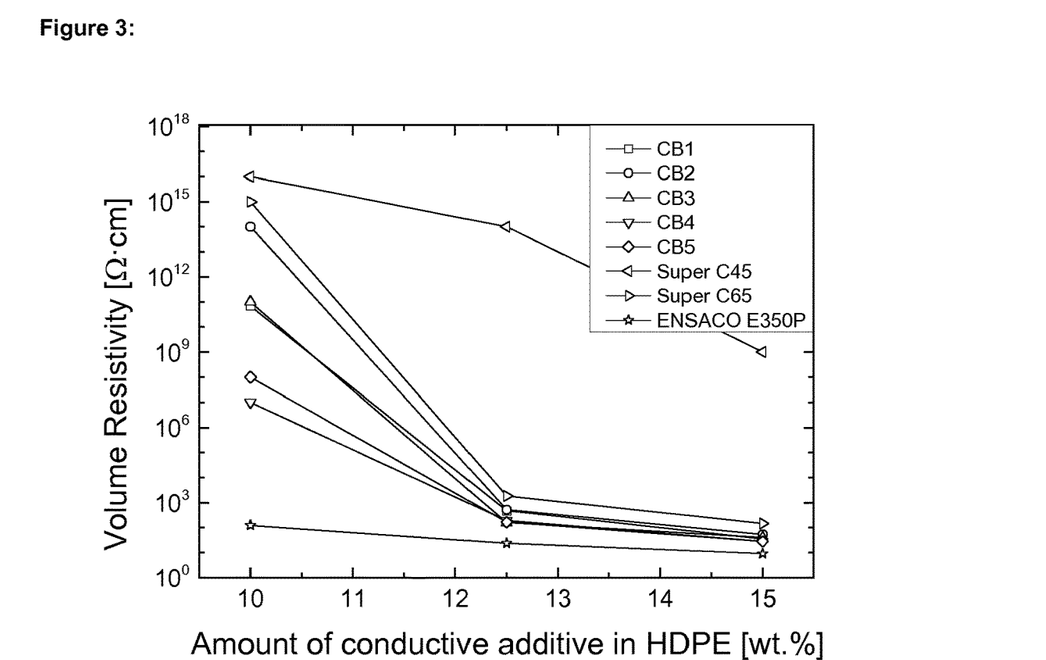
FIG. 3 illustrates percolation curves (volume resistivity) of various carbon blacks in high density polyethylene (HDPE) in a concentration range of 10 to 15 wt % of carbon black.

The various carbon black materials were also added at various concentrations (10, 12.5 and 15 wt %) to high density polyethylene (HDPE), and the resulting volume resistivity determined. The results are given in Table 4 below and the corresponding percolation curves are shown in FIG. 3.

TABLE 4

Electrical resistivities of various carbon black products in HDPE

| | Analysis Parameter | | |
|---|---|---|---|
| | Volume Resistivity in HDPE Compound (10 wt. %) | Volume Resistivity in HDPE Compound (12.5 wt. %) | Volume Resistivity in HDPE Compound (15 wt. %) |
| Unit | Ω · cm | Ω · cm | Ω · cm |
| CB | | | |
| CB1 | $10^{11}$ | 468 | 36 |
| CB2 | $10^{14}$ | 525 | 54 |
| CB3 | $10^{11}$ | 158 | 41 |
| CB4 | $10^{7}$ | 194 | 29 |
| CB5 | $10^{8}$ | 167 | 28 |
| References | | | |
| C-NERGY™ Super C45 | $10^{16}$ | $10^{14}$ | $5 \times 10^{7}$ |
| C-NERGY™ Super C65 | $10^{15}$ | 1848 | 137 |
| ENSACO® 350P | 125 | 24 | 11 |

The invention claimed is:

1. A carbon black material comprising:
   (i) a ratio of cOAN/OAN of at least about 40%;
   (ii) a BET SSA of between about 80 and about 400 m²/g; and
   (iii) a fraction of micropores of at least 0.30.

2. The carbon black material according to claim 1, further comprising having a cOAN of between about 100 and about 250.

3. The carbon black material according to according to claim 1, further comprising an OAN of between about 150 and about 350.

4. The carbon black material according to claim 1, wherein the ratio of cOAN/OAN is less than 75%.

5. The carbon black material according to claim 1, wherein the fraction of micropores of the material is at least about 0.50.

6. The carbon black material according to claim 1, further comprising an external surface area based on the statistical thickness method (STSA) of between about 70 and about 300 m²/g.

7. The carbon black material according to claim 1, further comprising a pore size of the intra-aggregate porosity (IF), determined by mercury intrusion porosimetry, of between about 35 and about 70 nm.

8. The carbon black material according to according to claim 1, further comprising a xylene density of between about 1.80 and 2.00 g/cm³.

9. The carbon black material according to claim 1, further comprising an interlayer spacing c/2 of between about 0.3580 and about 0.3640 nm.

10. The carbon black material according to claim 1, comprising a viscosity of below about 5000 mPa·s when determined in a 5 wt % dispersion of said carbon black material in N-methyl-2-pyrrolidone (NMP) at a shear rate of 13 s⁻¹.

11. The carbon black material according to claim 1, comprising having a powder electrical resistivity of between about 45 and about 230 Ω·cm, when present in a powder comprised of 2 wt. % of said carbon black material in 98 wt. % Lithium Nickel Manganese Cobalt Oxide (NMC).

12. The carbon black material according to claim 1, comprising having an electrode resistivity of between about 400 and about 1200 Ω·cm, when determined by a 2-point measurement in an electrode containing a film comprised of 1 wt. % of said carbon black material, 3 wt. % of PVDF binder in 96 wt. % NMP.

13. The carbon black material according to claim 1, comprising having an electrode resistivity of between about 400 and about 1100 Ω·cm, when determined by a 4-point measurement in an electrode containing a film comprised of 1 wt. % of said carbon black material, 2 wt. % of PVDF binder in 97 wt. % NMP.

14. The carbon black material according to claim 1, comprising having a volume electrical resistivity in high density polyethylene (HDPE) of
   (i) between about 100 to about 1000 Ω·cm, when the HDPE composite material contains 12.5 wt % of said carbon black material, and
   (ii) between about 10 to about 100 Ω·cm, or between about 20 to about 80 Ω·cm, when the HDPE composite material contains 15 wt % of said carbon black material.

15. A conductive composition comprising
   the carbon black material according to claim 1, and
   one or more of another carbon black, fine graphite, exfoliated graphite, nano-graphite, sub-micron graphite, exfoliated graphite, graphene, carbon nano-tubes, and carbon fibers.

16. A conductive polymer composite material comprising the carbon black material according to claim 1.

17. An electric vehicle, hybrid electric vehicle, or plug-in hybrid electric vehicle comprising a lithium ion battery, wherein said lithium ion battery comprises the carbon black material according to claim 1.

18. A ceramic, ceramic precursor material, or a green material comprising the carbon black material according to claim 1.

19. A dispersion comprising a liquid and the carbon black material according to claim 1.

20. A product comprising the carbon black of claim 1, wherein the product is an energy storage device, a lithium ion battery, an electrode, or a carbon brush.

21. The carbon black material according to claim 1, wherein the carbon black material comprises an average particle size of 30-40 nm.

* * * * *